US012734384B2

(12) United States Patent
van Rooijen et al.

(10) Patent No.: US 12,734,384 B2
(45) Date of Patent: Sep. 15, 2026

(54) RISER MANIFOLD LAYOUT

(71) Applicant: Tyco Fire Products LP, Cranston, RI (US)

(72) Inventors: Gijsbert van Rooijen, Enschede (NL); Joshua Motha, Tiverton, RI (US)

(73) Assignee: Tyco Fire Products LP, Cranston, RI (US)

( * ) Notice: Subject to any disclaimer, the term of this patent is extended or adjusted under 35 U.S.C. 154(b) by 695 days.

(21) Appl. No.: 18/247,105

(22) PCT Filed: Dec. 22, 2021

(86) PCT No.: PCT/IB2021/062210

§ 371 (c)(1),
(2) Date: Mar. 29, 2023

(87) PCT Pub. No.: WO2022/144706

PCT Pub. Date: Jul. 7, 2022

(65) Prior Publication Data

US 2023/0372755 A1 Nov. 23, 2023

Related U.S. Application Data

(60) Provisional application No. 63/131,070, filed on Dec. 28, 2020.

(51) Int. Cl.
*A62C 35/68* (2006.01)
*A62C 35/60* (2006.01)
(Continued)

(52) U.S. Cl.
CPC .............. *A62C 35/68* (2013.01); *A62C 35/60* (2013.01); *A62C 37/50* (2013.01); *F16K 15/035* (2013.01)

(58) Field of Classification Search
CPC ......... A62C 37/50; A62C 35/60; A62C 35/68; A62C 35/645; A62C 35/58; A62C 35/605; A62C 31/02; E03B 7/077; E03C 1/106
See application file for complete search history.

(56) References Cited

U.S. PATENT DOCUMENTS 6,076,545 A 6/2000 Cooper
7,845,424 B1 * 12/2010 Miller .................... A62C 35/60 169/13
(Continued)

FOREIGN PATENT DOCUMENTS

CN 1605782 A 4/2005
CN 202148899 U 2/2012
(Continued)

OTHER PUBLICATIONS

Korean Intellectual Property Office as International Searching Authority; International Search Report and Written Opinion; International Patent Application No. PCT/IB2021/062210; Apr. 11, 2022; 10 pages.
(Continued)

*Primary Examiner* — Christopher R Dandridge
(74) *Attorney, Agent, or Firm* — Foley & Lardner LLP

(57) ABSTRACT

A riser manifold assembly includes a control valve, a first spool pipe, a flow control switch, a check valve, a second spool pipe, and a test and drain valve. An inlet of the first spool pipe being mechanically coupled and fluidly sealed with an outlet of the control valve. The flow control switch being mechanically mounted to the first spool pipe. An inlet of the check valve being mechanically coupled and fluidly sealed with an outlet of the first spool pipe. An inlet of the second spool pipe being mechanically coupled and fluidly sealed with an outlet of the check valve. The test and drain
(Continued)

valve being mechanically coupled and fluidly sealed with an auxiliary port of the second spool pipe.

10 Claims, 9 Drawing Sheets

(51) Int. Cl.
*A62C 37/50* (2006.01)
*F16K 15/03* (2006.01)

(56) References Cited

U.S. PATENT DOCUMENTS

| | | | |
|---|---|---|---|
| 10,912,964 | B2 | 2/2021 | Ringer et al. |
| 2002/0108759 | A1 | 8/2002 | Hagen et al. |
| 2018/0043197 | A1 * | 2/2018 | Ringer .................. F16K 37/005 |
| 2019/0388719 | A1 | 12/2019 | Meyer et al. |
| 2020/0164239 | A1 | 5/2020 | Ringer et al. |

FOREIGN PATENT DOCUMENTS

| | | | |
|---|---|---|---|
| CN | 209476353 | U | 10/2019 |
| GB | 0 957 431 | A | 5/1964 |
| JP | 2014-188092 | A | 10/2014 |
| KR | 10-1666070 | B1 | 10/2016 |
| WO | WO-2018/140545 | A1 | 8/2018 |

OTHER PUBLICATIONS

"Chinese Fire Protection Manual vol. 12: Fire-fighting Equipment: Fire-fighting Products," edited by Fire Bureau of the Ministry of Public Security of the People's Republic of China, Shanghai Scientific and Technical Publishers, Dec. 31, 2007 (pp. 516-517).

* cited by examiner

RISER MANIFOLD LAYOUT

CROSS-REFERENCE TO RELATED APPLICATIONS

The present application claims the benefit of priority to U.S. Provisional Application No. 63/131,070, filed Dec. 28, 2020, the disclosure of which is incorporated herein by reference in its entirety.

BACKGROUND

A riser manifold assembly can connect a fire suppression fluid source to a fire suppression system. The riser manifold assembly can be used in NFPA 13 sprinkler systems to prevent a backflow of fire suppression fluid and provide an alarm indicating fluid flow.

SUMMARY

At least one aspect relates to a riser manifold assembly. The riser manifold assembly can include a control valve, a first spool pipe, a flow control switch, a check valve, a second spool pipe, and a test and drain valve. The control valve defined by an inlet and an outlet. The control valve being operable between an open position, permitting fluid flow between the inlet and the outlet, and a closed position, inhibiting fluid flow between the inlet and the outlet. The first spool pipe defined by an inlet and an outlet. The inlet of the first spool pipe being mechanically coupled and fluidly sealed with the outlet of the control valve. The first spool pipe having a flow port between the inlet and the outlet of the first spool pipe. The flow control switch having a vane inserted in the flow port of the first spool pipe. The flow control switch being mechanically mounted to the first spool pipe and creating a fluid seal between the flow control switch and the flow port. The check valve defined by an inlet and an outlet. The inlet of the check valve being mechanically coupled and fluidly sealed with the outlet of the first spool pipe. The check valve having a valve seat and a clapper. The clapper being movable between an open position, allowing fluid flow from the inlet to the outlet, and a closed position, inhibiting fluid flow from the outlet to the inlet, according to a pressure differential between the inlet and the outlet. The check valve including a first pressure port located between the valve seat and the outlet of the check valve. The check valve further including a first auxiliary port located between the valve seat and the outlet of the check valve. The second spool pipe having an inlet and an outlet. The inlet being mechanically coupled and fluidly sealed with the outlet of the check valve. The second spool pipe having a second auxiliary port located between the inlet and the outlet of the second spool pipe. The test and drain valve being mechanically coupled and fluidly sealed with the second auxiliary port of the second spool pipe.

At least one aspect relates to a method of assembly of a riser manifold assembly. The method includes providing a control valve. The control valve defined by an inlet and an outlet. The control valve being operable between an open position, permitting fluid flow between the inlet and the outlet, and a closed position, inhibiting fluid flow between the inlet and the outlet. The method further includes coupling an inlet of a first spool pipe, defined by the inlet and an outlet, with the outlet of the control valve creating a fluid seal between the first spool pipe and the control valve. The first spool pipe having a flow port between the inlet and the outlet of the first spool pipe. The method further includes mounting a flow control switch, having a vane inserted in the flow port of the first spool pipe, to the first spool pipe creating a fluid seal between the flow control switch and the flow port. The method further includes coupling an inlet of a check valve, defined by the inlet and an outlet, with the outlet of the first spool pipe creating a fluid seal. The check valve having a valve seat and a clapper. The clapper being movable between an open position, allowing fluid flow from the inlet to the outlet, and a closed position, inhibiting fluid flow from the outlet to the inlet, according to a pressure differential between the inlet and the outlet. The check valve including a first pressure port located between the valve seat and the outlet of the check valve. The check valve further including a first auxiliary port located between the valve seat and the outlet of the check valve. The method further includes coupling an inlet of a second spool pipe, defined by the inlet and an outlet, with the outlet of the check valve creating a fluid seal. The second spool pipe having a second auxiliary port located between the inlet and the outlet of the second spool pipe. The method further includes coupling a test and drain valve with the second auxiliary port of the second spool pipe creating a fluid seal.

At least one aspect relates to a method of providing a riser manifold assembly. The method includes providing a riser manifold assembly. The riser manifold assembly includes a control valve, a first spool pipe, a flow control switch, a check valve, a second spool pipe, and a test and drain valve. The control valve defined by an inlet and an outlet. The control valve being operable between an open position, permitting fluid flow between the inlet and the outlet, and a closed position, inhibiting fluid flow between the inlet and the outlet. The first spool pipe defined by an inlet and an outlet. The inlet of the first spool pipe being mechanically coupled and fluidly sealed with the outlet of the control valve. The first spool pipe having a flow port between the inlet and the outlet of the first spool pipe. The flow control switch having a vane inserted in the flow port of the first spool pipe. The flow control switch being mechanically mounted to the first spool pipe and creating a fluid seal between the flow control switch and the flow port. The check valve defined by an inlet and an outlet. The inlet of the check valve being mechanically coupled and fluidly sealed with the outlet of the first spool pipe. The check valve having a valve seat and a clapper. The clapper being movable between an open position, allowing fluid flow from the inlet to the outlet, and a closed position, inhibiting fluid flow from the outlet to the inlet, according to a pressure differential between the inlet and the outlet. The check valve including a first pressure port located between the valve seat and the outlet of the check valve. The check valve further including a first auxiliary port located between the valve seat and the outlet of the check valve. The second spool pipe having an inlet and an outlet. The inlet being mechanically coupled and fluidly sealed with the outlet of the check valve. The second spool pipe having a second auxiliary port located between the inlet and the outlet of the second spool pipe. The test and drain valve being mechanically coupled and fluidly sealed with the second auxiliary port of the second spool pipe.

At least one aspect relates to a riser manifold assembly. The riser manifold assembly can include a check valve and a test and drain valve. The check valve can have an inlet, an outlet, a valve seat, and a clapper movable between an open position to allow fluid flow from the inlet to the outlet and a closed position to prevent fluid flow from the outlet to the inlet based on a pressure differential between the inlet and the outlet. The check valve can include one or more ports. The test and drain valve can be coupled with a spool pipe.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Following below are more detailed descriptions of various concepts related to, and implementations of a riser manifold layout also called a riser manifold assembly. Riser manifold assemblies can limit the amount of onsite construction time, and allow for pressure testing of the entire manifold prior to installation. The ability to pressure test as a manifold separate from a fire system valve can allow for a reduction in shipping damage, reduce a valve pallet size, and reduce shipping container complexity. The riser manifold assembly can allow for the rotation of the individual components along a longitudinal axis. The riser manifold assembly can be used for installation, setup, testing, retrofitting, or various other such operations, including by providing some components of the riser manifold assembly for pressure tests, and leaving or removing any of one or more of the components subsequent to the pressure test. The various concepts introduced above and discussed in greater detail below can be implemented in any of numerous ways, including in dry systems and in wet systems.

Figure 1:
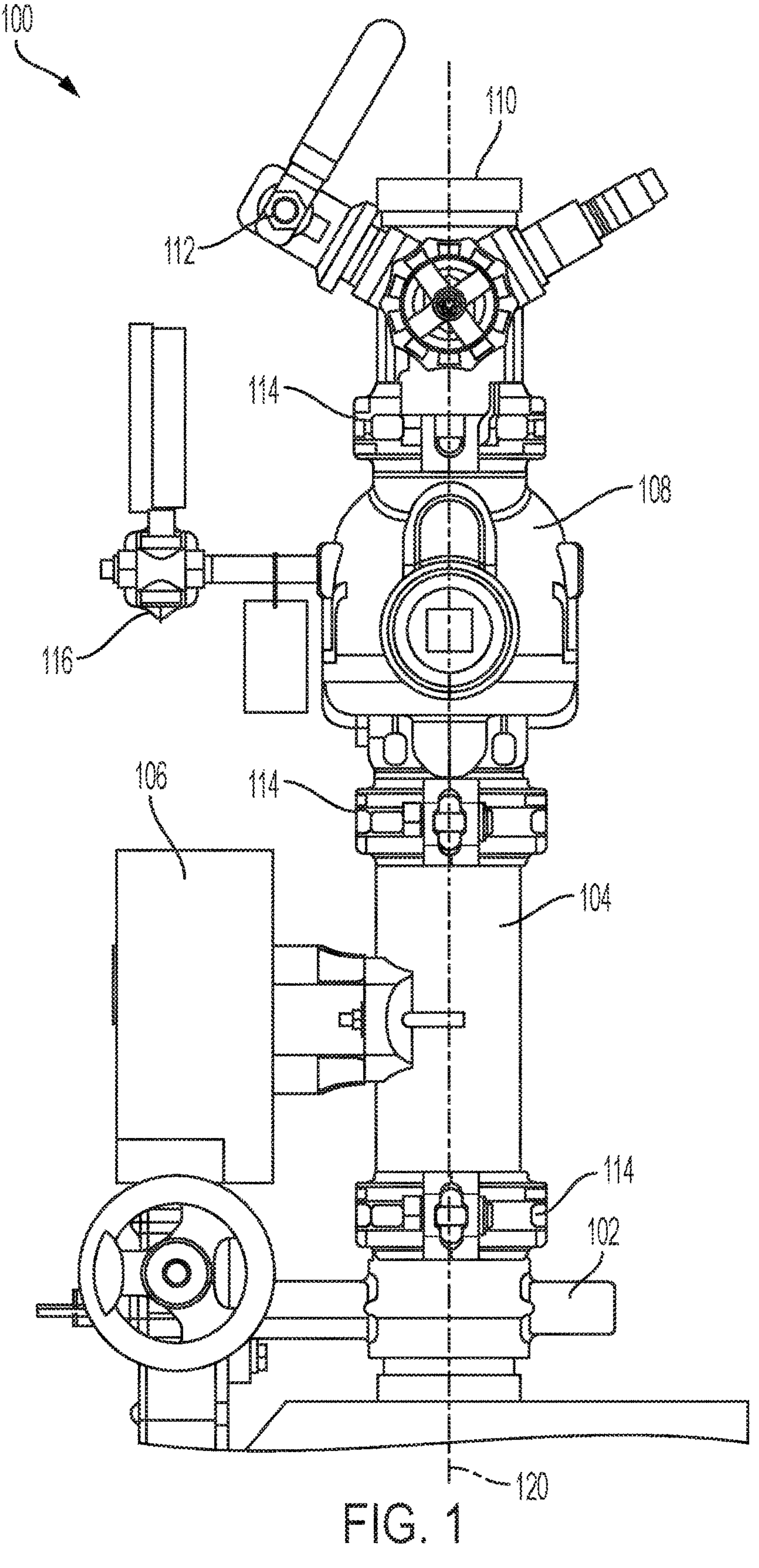
FIG. 1 is an illustration of a riser manifold assembly.

Referring to FIG. 1, among others, an example riser manifold assembly 100 is shown. The riser manifold assembly 100 can include a control valve 102, a first pipe (e.g., spool pipe) 104, a flow control switch 106, a check valve 108, a second pipe (e.g., spool pipe) 110, a test and drain valve 112, a plurality of couplings 114, and a pressure gauge 116. The riser manifold assembly 100 can include one or more of various such components or combinations or subsets thereof. The control valve 102, first spool pipe 104, check valve 108, second spool pipe 110, and the plurality of couplings 114 can be centered along a first longitudinal axis 120 creating a fluid passage. The riser manifold assembly 100 can connect a fluid source (e.g., water, fire suppression fluid), to a fire suppression system. The riser manifold assembly 100 can prevent a back flow of fluid (e.g., air, nitrogen, water) from the fire suppression system to the fluid source. The riser manifold assembly can indicate a flow of fluid from the fluid source to the fire suppression system.

The riser manifold assembly 100 can be connected with a fluid source by an inlet 202 of the control valve 102. For example, the inlet 202 of the control valve 102 can be mechanically coupled and fluidly sealed (e.g., preventing leaks between the adjoining components) to a fluid source (e.g., pipe carrying fire suppression fluid). The control valve 102 can be mechanically coupled with the fluid source utilizing a coupling 114, welded connection, threaded connection, etc. The use of the coupling 114 in mechanically coupling the inlet 202 of the control valve 102 to the fluid source can be beneficial as it allows the control valve 102 to be rotated about the first longitudinal axis 120 relative to the fluid source depending on user needs (e.g., confined space). The control valve 102 can operate between an open position and a closed position based on a user input (e.g., mechanically opening or closing, actuation based on an electronic signal). When the control valve 102 is in the open position fluid can be able to flow through the control valve (e.g., from inlet 202 to outlet 204). When the control valve is in the closed position, fluid flow through the control valve can be inhibited (e.g., no fluid flow). The outlet 204 of the control valve 102 can be mechanically coupled and fluidly sealed to an inlet 402 of the first spool pipe 104 creating a fluid passage between the control valve 102 and the first spool pipe 104. The outlet 204 of the control valve 102 can be mechanically coupled with the inlet 402 of the first spool pipe 104 utilizing a coupling 114, welded connection, threaded connection, etc.

The flow control switch 106 can be mechanically coupled and fluidly sealed to a flow port 408 of the first spool pipe 104. A vane 502 of the flow control switch 106 can be inserted into the flow port 408 of the first spool pipe 104 such that the vane 502 can be positioned within the first spool pipe 104. The vane 502 of the flow control switch 106 can create a seal on an internal surface of the first spool pipe 104 such that the vane 502 is propelled relative to the first spool pipe 104 when fluid flows between the inlet 402 and the outlet 404 of the first spool pipe 104. As such, the flow control switch 106 can indicate fluid flow through the riser manifold assembly 100.

An outlet 404 of the first spool pipe 104 can be mechanically coupled and fluidly connected with an inlet 602 of the check valve 108. The outlet 404 of the first spool pipe 104 can be mechanically coupled with the inlet 602 of the check valve 108 utilizing a coupling 114, welded connection, threaded connection, etc. The first spool pipe 104 can be rotated about the first longitudinal axis 120 relative to the control valve 102 and the check valve 108. The check valve 108 can function between an open position and a closed position based on the pressure differential between the inlet 602 and the outlet 604. For example, when there is a pressure differential between the inlet 602 and the outlet 604 great enough (e.g., pressure at inlet 602 is greater than the pressure at the outlet 604) to force the check valve open, the check valve 108 can permit the flow of fluid from the inlet 602 to the outlet 604. The check valve 108 can inhibit the flow of fluid between the outlet 604 and the inlet 602, thus preventing a backflow of fluid through the riser manifold assembly 100 from the fire suppression system to the fluid source.

A pressure gauge 116 can be mechanically coupled and fluidly sealed to a pressure port 616 of the check valve 108. For example, the pressure gauge 116 can be mechanically coupled (e.g., threaded, welded) directly to the pressure port 616 or fluidly connected by a nipple to the pressure port 616. The pressure gauge 116 can be an analog gauge, digital gauge, a pressure sensor, etc. The pressure gauge 116 can provide a sensed pressure at the outlet 604 of the check valve 108. The pressure at the outlet 604 of the check valve 108 can be indicative of the fire suppression system pressure. The outlet 604 of the check valve 108 can be mechanically coupled and fluidly connected with an inlet 702 of the second spool pipe 110. The outlet 604 can be mechanically coupled with the inlet 702 108 utilizing a coupling 114, welded connection, threaded connection, etc. The check valve 108 can be rotated about the first longitudinal axis 120 relative to the first spool pipe 104 and the second spool pipe 110.

The second spool pipe 110 can have an inlet 702, an outlet 704, and an auxiliary port 706. The auxiliary port 706 can also be referred to as a second auxiliary port 706. The second spool pipe 110 can connect the check valve 108, through the second spool pipe 110 to the test and drain valve 112. The second spool pipe 110 can connect the riser manifold assembly 100 to the fire suppression system. The outlet 704 of the second spool pipe 110 can be mechanically coupled and fluidly sealed to the fire suppression system (e.g., additional spool pipes leading to sprinklers). The outlet 704 can be mechanically coupled with the fire suppression system by a coupling 114, a welded connection, a threaded connection, etc.

An inlet 902 of the test and drain valve 112 can be mechanically coupled and fluidly sealed to the auxiliary port 706 of the second spool pipe 110. For example, the inlet 902 of the test and drain valve 112 can have external threads that correspond to internal threads of the auxiliary port 706 of the second spool pipe 110 such that the test and drain valve 112 can be threaded into the second spool pipe 110. This is an example configuration and many other configurations are possible, such as, the inlet 902 of the test and drain valve can be coupled with the auxiliary port 706 of the second spool pipe 110 utilizing a mechanical coupling 114. The test and drain valve 112 can provide a valve for a user to test the riser manifold assembly 100 to ensure the functioning of the check valve 108, the flow control switch 106, or the control valve 102. The test and drain valve 112 can provide a drain port 816 to allow the fire suppression system to be drained. The test and drain valve 112 can provide a pressure relief valve 804 to allow for the relief of fluid in the instance that the pressure of the fluid is above a preset pressure (e.g., 15 PSI, 50 PSI, 200 PSI, 500 PSI).

The connections of the components of the riser manifold assembly 100 along the first longitudinal axis 120 can include intermediary pieces not shown in FIG. 1. For example, between the outlet 204 of the control valve 102 and the inlet 402 of the first spool pipe 104, a gasket (e.g., rubber, steel) can be used to ensure a fluidly sealed connection.

Figure 2:
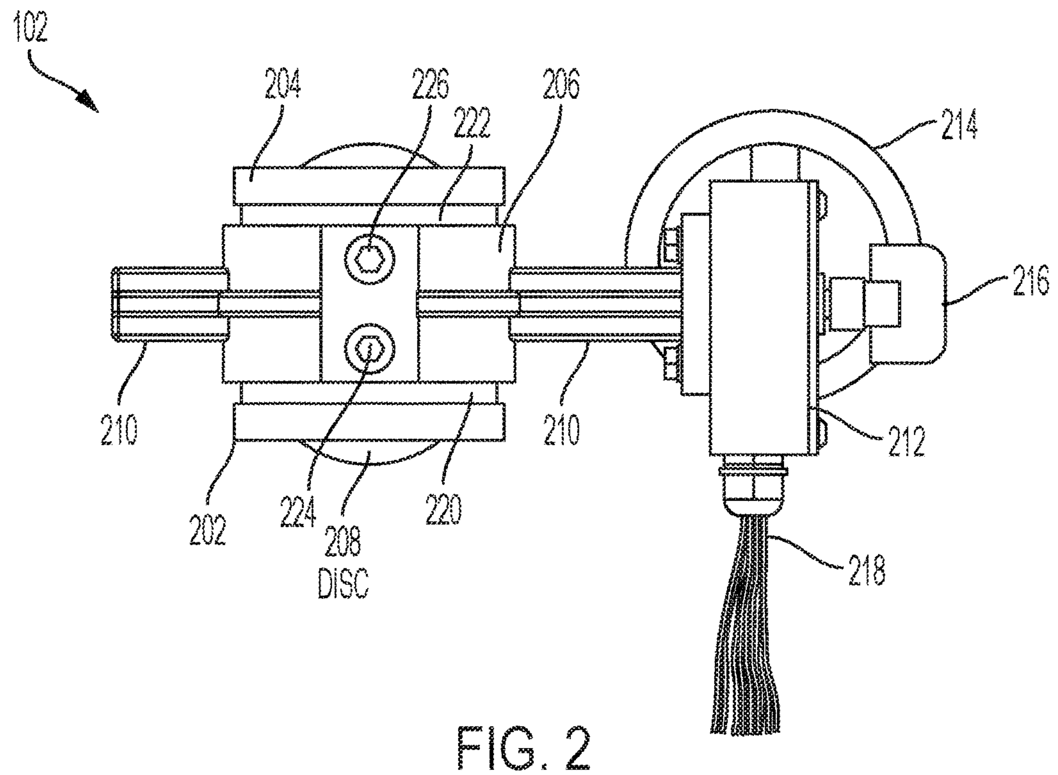
FIG. 2 is an illustration of a side view of a control valve.
Figure 3:
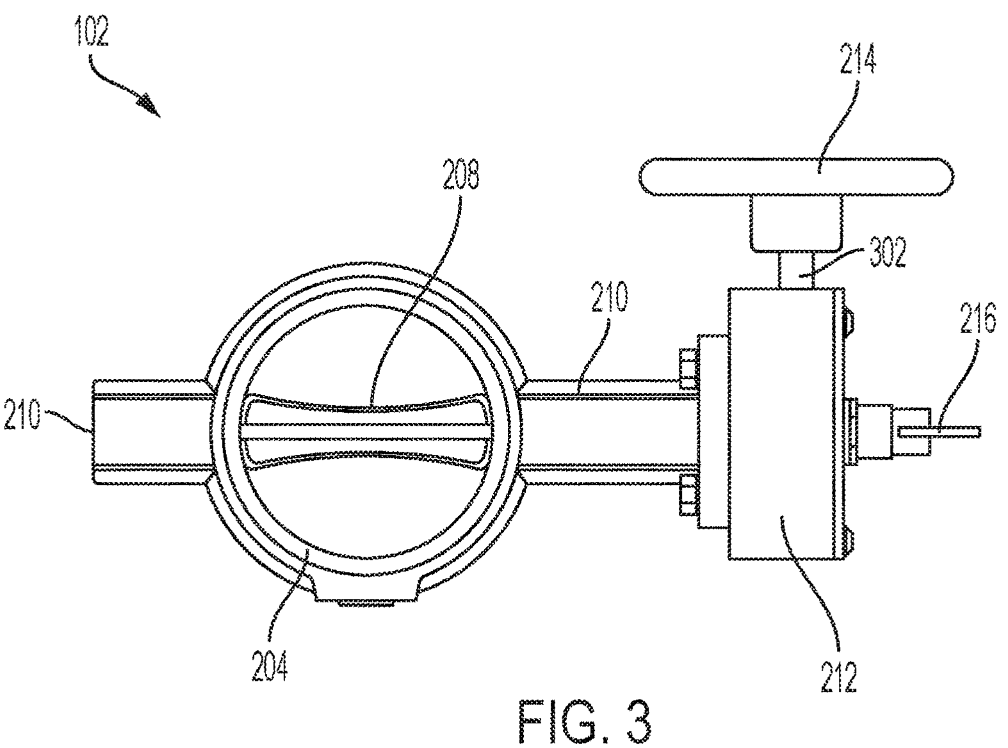
FIG. 3 is an illustration of a top view of a control valve.

Referring now to FIGS. 2 and 3, among others, a side view and a top view of the control valve 102 are shown, respectively. The control valve 102 is shown as a butterfly valve, but the disclosure is not so limited. The control valve 102 can include an inlet 202, an outlet 204, a valve body 206, a disk 208, a shaft housing 210, a gear box 212, a hand wheel 214, a hand wheel shaft 302, a valve indicator 216, and control wires 218. The control valve 102 can operate between an open position and a closed position based on a user input (e.g., mechanically opening or closing, actuation based on an electronic signal). When the control valve 102 is in the open position fluid can be permitted to flow through the control valve (e.g., from inlet 202 to outlet 204). When the control valve is in the closed position, fluid flow through the control valve can be inhibited (e.g., no fluid flow). The user input can be a rotation of the hand wheel 214 or a signal from a device transmitted to the control valve 102 via the control wires 218.

The inlet 202, as shown in FIG. 2, can include an inlet groove 220 defining a recession located on an outer surface of the control valve 102 located inward (e.g., nearer a center of the control valve 102) of the inlet 202. The inlet groove 220 can surround a circumference of the inlet 202. The inlet groove 220 can be an abrupt groove (e.g., squared edges) or can be a rounded or chamfered groove. The inlet groove 220 can provide a recession for the control valve 102 to be connected with a pipe spool or fluid source utilizing a mechanical coupling 114. The inlet 202 can be configured for a welded connection. The inlet 202 can be configured for a threaded connection (e.g., internal threads, external threads). The outlet 204, as shown in FIG. 2, can include an outlet groove 222 defining a recession located on an outer surface of the control valve 102 located inward (e.g., nearer a center of the control valve 102) of the outlet 204. The outlet groove 222 can surround a circumference of the outlet 204. The outlet groove 222 can be an abrupt groove (e.g., squared edges) or can be a rounded or chamfered groove. The outlet groove 222 can provide a recession for the control valve 102 to be connected with the first spool pipe 104, among many possible connections, utilizing a mechanical coupling 114. The outlet 204 can be configured for a welded connection. The outlet 204 can be configured for a threaded connection (e.g., internal threads, external threads).

The valve body 206 can house a selectively rotatable control shaft, a disk 208, an upstream tapping boss 224, and a downstream tapping boss 226. The valve body 206 can include a valve seat that can provide a seal with the disk 208 to prevent the flow of fluid through the valve body 206 when the control valve 102 is in a closed position. The valve body 206 can be connected with a shaft housing 210. The shaft housing 210 can provide protection to the selectively rotatable control shaft (e.g., inhibit bending, inhibit rusting). The shaft housing 210 can extend from a first side of the valve body 206 and a second side of the valve body 206 such that the selectively rotatable control shaft can extend through the valve body 206. The shaft housing 210 can include bushings or bearings. The selectively operated control shaft or selectively operated shaft can be connected with the disk 208 such that rotation of the selectively operated shaft can cause the disk 208 to rotate. The rotation of the disk 208 can open and close the control valve 102. The upstream tapping boss 224 can be located between the inlet 202 and the rotatable control shaft (e.g., the center of the valve body 206). The upstream tapping boss 224 can allow for a simple connection to the system upstream of the control valve 102. For example, the upstream tapping boss 224 can be used to provide a connection for a prime line of a deluge valve. This is an example embodiment and many other configurations are possible. The downstream tapping boss 226 can be located between the rotatable control shaft (e.g., center of the valve body 206) and the outlet 204. The downstream tapping boss 226 can allow for a simple connection to the system upstream of the control valve 102. For example, the downstream tapping boss 226 can be used to provide a connection for a drain valve, which can be used to drain the fluid from the system downstream of the control valve 102.

The hand wheel 214 can be rotated clockwise and counterclockwise providing a rotation of the hand wheel shaft 302, which can be transmitted through the gear box 212 to the selectively operated control shaft. The rotation of the selectively operated shaft rotate the disk 208, thus opening and closing the control valve 102. The gear box 212 can provide a gear ratio between the hand wheel shaft 302 and the selectively operated shaft. For example, the gear box 212 can have a gear ratio of 20:1 which would require five full rotations of the hand wheel to rotate the disk by 90 degrees thus closing or opening the valve. This is an example configuration and the gear box 212 can have any suitable gear ratio (e.g., 1:1, 2:1, 4:1, 100:1). The gear box can further include an electric motor (e.g., stepper motor) which can act to rotate the selectively operated shaft based on an input signal received through the control wires 218. The gear box 212 can include a valve indicator 216 which can indicate the position of the disk 208 (e.g., open, closed, partially open). The control wires 218 can connect a number of different computing devices (e.g., controller, computing system) to motors or sensors in the gear box 212 which can rotate the selectively operated shaft or sense the position of the selectively operated shaft, respectively.

Figure 4:
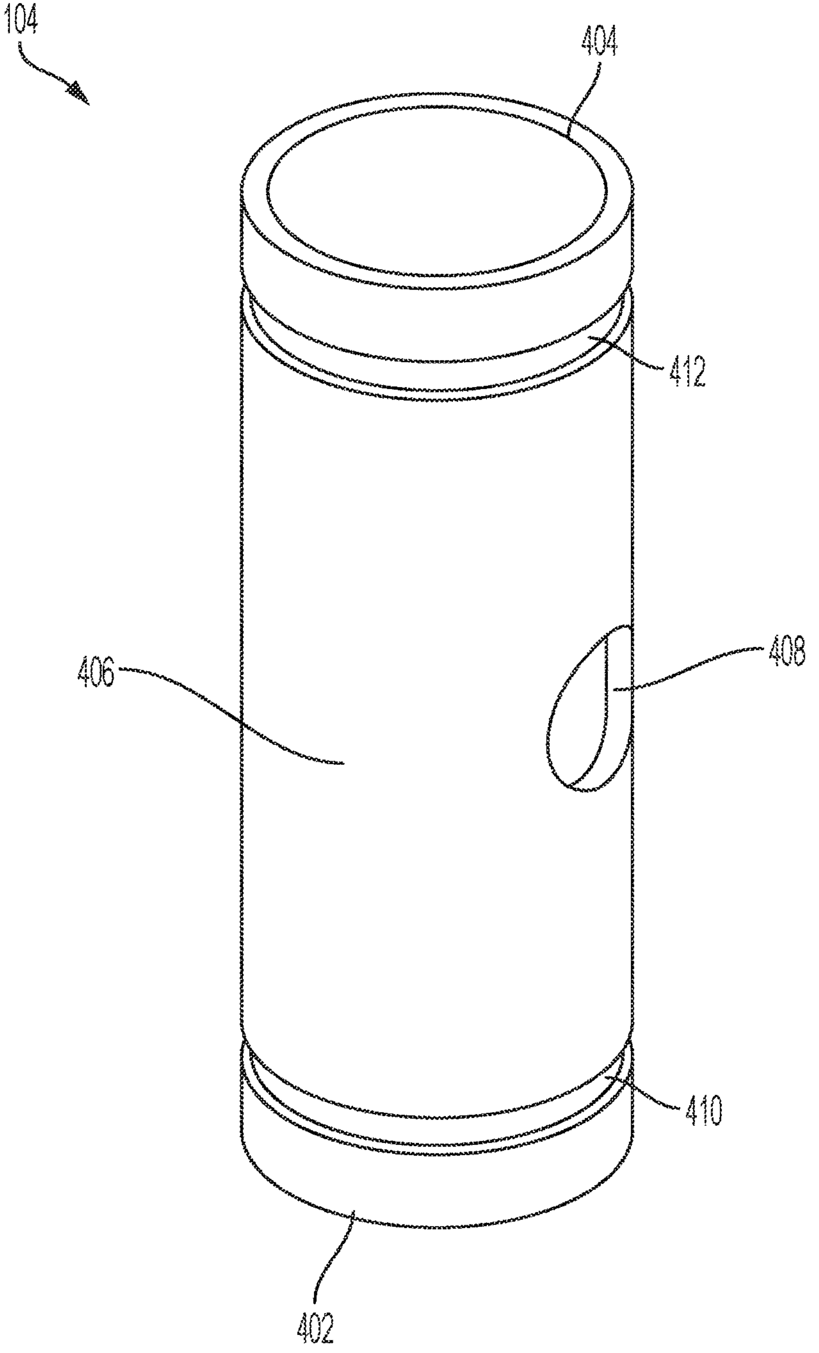
FIG. 4 is an illustration of a first spool pipe.

Referring now to FIG. 4, among others, an illustration of a first spool pipe 104 is shown. The first spool pipe 104 can include an inlet 402, an outlet 404, a spool body 406, and a flow port 408. The inlet 402, as shown in FIG. 4, can include an inlet groove 410 defining a recession located on an outer surface of the spool body 406 located inward (e.g., nearer a center of the first spool pipe 104) of the inlet 402. The inlet groove 410 can surround a circumference of the inlet 402. The inlet groove 410 can be an abrupt groove (e.g., squared edges) or can be a rounded or chamfered groove. The inlet groove 410 can provide a recession for the first spool pipe 104 to be connected with the control valve 102, among other components, utilizing a mechanical coupling 114. The inlet 402 can be configured for a welded connection. The inlet 402 can be configured for a threaded connection (e.g., internal threads, external threads). The outlet 404, as shown in FIG. 4, can include an outlet groove 412 defining a recession located on an outer surface of the first spool pipe 104 located inward (e.g., nearer a center of the first spool pipe 104) of the outlet 404. The outlet groove 412 can surround a circumference of the outlet 404. The outlet groove 412 can be an abrupt groove (e.g., squared edges) or can be a rounded or chamfered groove. The outlet groove 412 can provide a recession for the first spool pipe 104 to be connected with the check valve 108, among many possible connections, utilizing a mechanical coupling 114. The outlet 404 can be configured for a welded connection. The outlet 404 can be configured for a threaded connection (e.g., internal threads, external threads).

The first spool pipe 104 can be made of any suitable material (e.g., steel, PVC, CPVC). The flow port 408 can be located between the inlet 402 and the outlet 404 of the first spool pipe 104. The flow port 408 can be of a suitable diameter (e.g., 1") such that the vane 502 of the flow control switch 106 can be inserted through the flow port 408. The flow port 408 can be perpendicular to the spool body 406 and horizontally centered.

Figure 5:
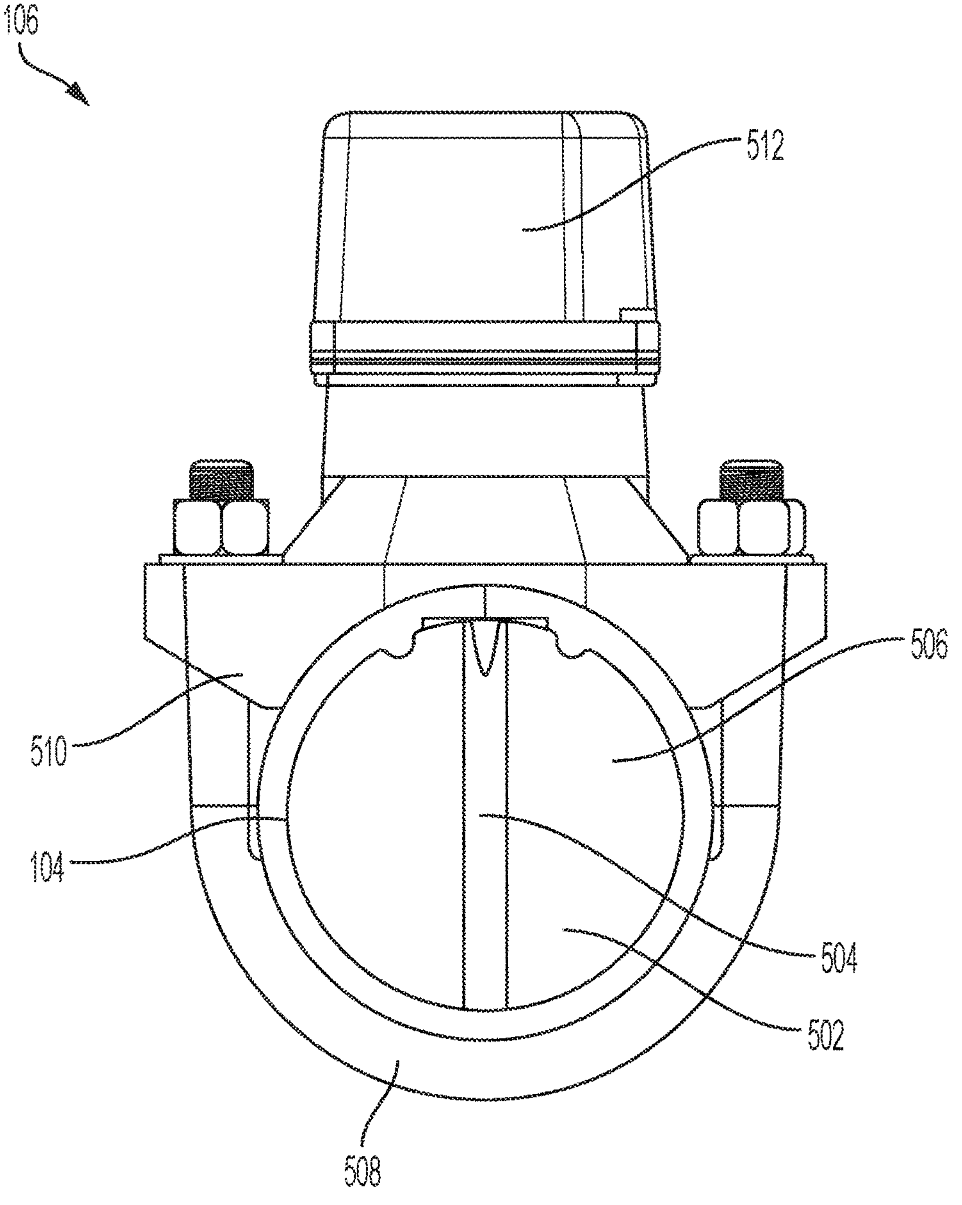
FIG. 5 is an illustration of a top view of a flow control switch.

Referring now to FIG. 5, among others, a top view of an assembled flow control switch 106 is shown. A particular flow control switch 106 is shown in FIG. 5, but the disclosure is not so limited. The flow control switch 106 can include a vane 502, a fastener 508, a pipe saddle 510, and a switch body 512. The flow control switch 106 can indicate the flow of a fluid through the first spool pipe 104 and provide an alert responsive to determining the flow of the fluid. This is beneficial as the flow of fluid through the riser manifold assembly 100 can indicate that the fire suppression system has responded to a fire. The vane 502 can include a rigid central portion 504 and a paddle 506. The paddle 506 can be a flexible material that can be rolled inward to be inserted in the flow port 408. Upon entering the flow port 408, the paddle 506 can be unspooled such that expands to create a seal with an inner wall of the first spool pipe 104. The paddle 506 can be coupled with the rigid inner portion 504. The rigid inner portion 504 can be mechanically coupled with a switch held within the switch body 512 such that the switch, within the switch body 512, can be triggered when the vane 502 is propelled by a flow of fluid through the first spool pipe 104. The switch body 512 can contain a switch mechanically coupled with the vane 502. The switch can further be connected with an alarm. The alarm can be connected with an alarm system (e.g., auditory alarms, visual alarms). The alarm can be connected with a computing system (e.g., via a network connection, Bluetooth) such that when the alarm is indicated a computing system can be alerted to respond (e.g., alert local authorities).

The switch body 512 can be mechanically coupled with the pipe saddle 510. The pipe saddle 510 can be formed to match a curvature of a standard pipe size (e.g., 2 inch, 4 inch, 8 inch). The pipe saddle 510 can have fastener holes located outward of a portion of the pipe saddle 510 formed to match a curvature of the first spool pipe 104. The fastener holes can provide a mount for any of a number of fasteners 508. The fasteners 508 can be any of a number of universal connectors (e.g., U-bolt). The fasteners 508 can be fastened to the pipe saddle 510 in any of a number of suitable methods (e.g., fastener washer and fastener nut). A gasket can be located between the pipe saddle 510 and the first spool pipe 104 to provide a fluidly sealed connection. The gasket can be a gasket, an o-ring, a washer, etc. The gasket can be made of any suitable material (e.g., rubber, nylon, steel).

Figure 6:
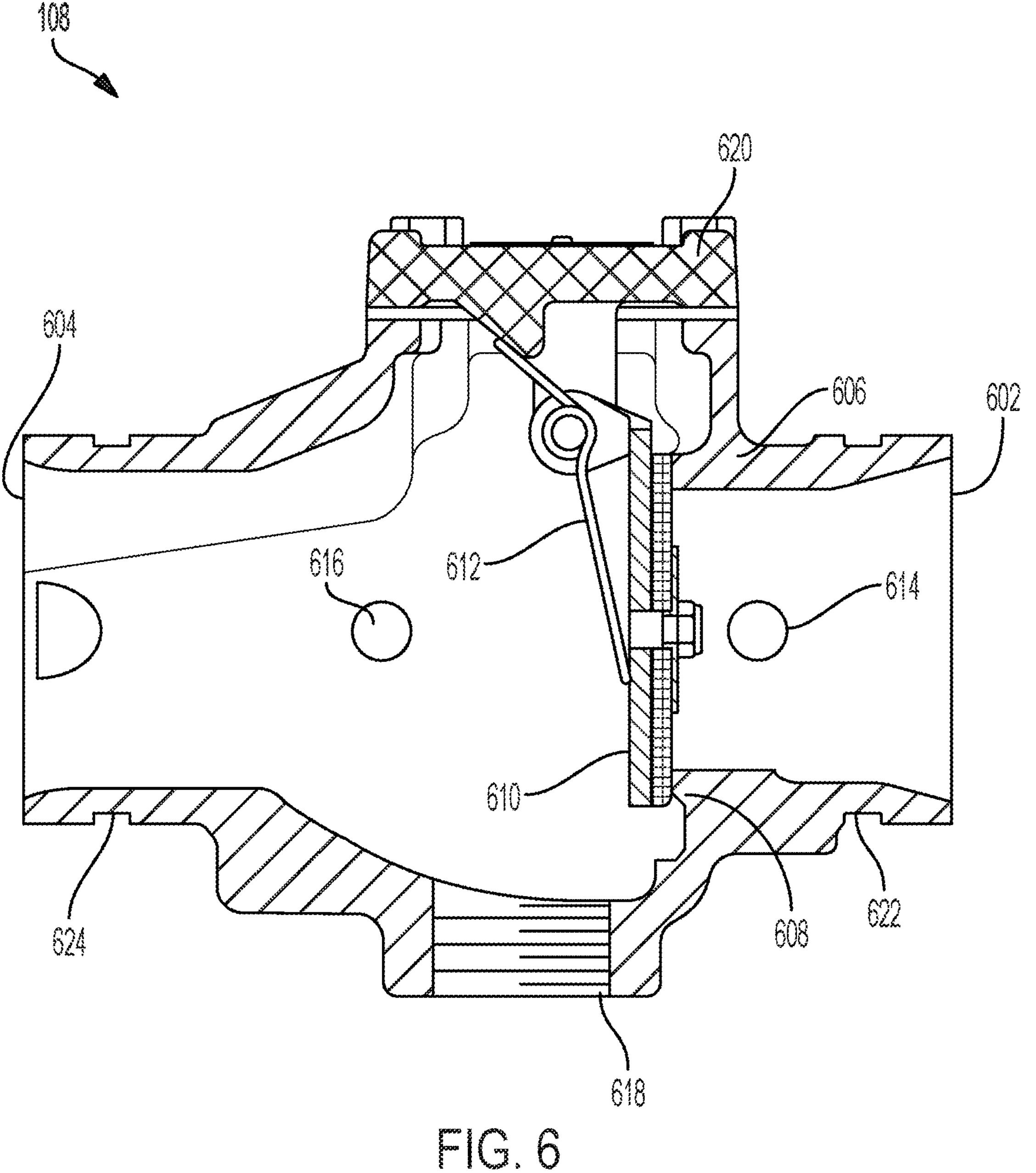
FIG. 6 is an illustration of a section view of a check valve.

Referring now to FIG. 6, among others, a section view of the check valve 108 is shown. A particular check valve 108 is shown in FIG. 6, but the disclosure is not so limited. The check valve can include an inlet 602, an outlet 604, a valve body 606, a valve seat 608, a clapper 610, a spring 612, an upstream pressure port 614, a downstream pressure port 616, an auxiliary port 618, and a valve cover 620. The inlet 602, as shown in FIG. 6, can include an inlet groove 622 defining a recession located on an outer surface of the valve body 606 located inward (e.g., nearer a center of the check valve 108) of the inlet 602. The inlet groove 622 can surround a circumference of the inlet 602. The inlet groove 622 can be an abrupt groove (e.g., squared edges) or can be a rounded or chamfered groove. The inlet groove 622 can provide a recession for the check valve 108 to be connected with the first spool pipe 104, among other components, utilizing a mechanical coupling 114. The inlet 602 can be configured for a welded connection. The inlet 602 can be configured for a threaded connection (e.g., internal threads, external threads). The outlet 604, as shown in FIG. 6, can include an outlet groove 624 defining a recession located on an outer surface of the valve body 606 located inward (e.g., nearer a center of the check valve 108) of the outlet 604. The outlet groove 624 can surround a circumference of the outlet 604. The outlet groove 624 can be an abrupt groove (e.g., squared edges) or can be a rounded or chamfered groove. The outlet groove 624 can provide a recession for the check valve 108 to be connected with the second spool pipe 110, among many possible connections, utilizing a mechanical coupling 114. The outlet 604 can be configured for a welded connection. The outlet 604 can be configured for a threaded connection (e.g., internal threads, external threads).

The valve body 606 can include a valve seat 608 on which the clapper 610 can be seated to prevent a back flow of fluid through the check valve 108 (e.g., flow from outlet 604 to inlet 602). The clapper 610 can rotate from a fixed pivot point attached to the valve body 606. The clapper 610 can move between a closed position (as shown in FIG. 6) and an open position, wherein the clapper 610 pivots upwards towards the valve cover 620. The clapper 610 can be moved based on a pressure differentia between the inlet 602 and the outlet 604. For example, the pressure differential between the inlet 602 and the outlet 604 must be great enough to overcome the force imposed by the spring 612 on an upper surface of the clapper 610. The clapper 610 can include a gasket on lower surface of the clapper 610. The gasket can promote a fluidly sealed connection between the clapper 610 and the valve seat 608.

The upstream pressure port 614 can be located between the inlet 602 and the valve seat 608. The upstream pressure port 614 can be a port through the valve body 606. The upstream pressure port 614 can provide a pressure of the riser manifold assembly 100 before the valve seat 608. The upstream pressure port 614 can be internally threaded such that a pressure gauge or a nipple with corresponding threads can be threaded into the upstream pressure port 614. The upstream pressure port can be configured to provide a port for a welded connection. The downstream pressure port 616 can be located between the valve seat 608 and the outlet 604. The downstream pressure port 616 can be a port through the valve body 606. The downstream pressure port 616 can provide a pressure reading of the riser manifold assembly 100 downstream of the valve seat 608 which can be the pressure of the fire suppression system. The downstream pressure port 616 can be internally threaded such that a pressure gauge 116, for example, or a nipple with corresponding threads can be threaded into the downstream pressure port 616. The downstream pressure port 616 can be configured to provide a port for a welded connection.

The auxiliary port 618 can be located between the valve seat 608 and the outlet 604. The auxiliary port 618 can have a diameter greater than one inch. The auxiliary port 618 can be internally threaded, as shown in FIG. 6. The auxiliary port 618 can be configured to provide a port for a welded connection. The auxiliary port 618 can be mechanically coupled and fluidly connected with a drain valve. The drain valve can drain the fire suppression system and the riser manifold assembly downstream of the auxiliary port 618.

The valve cover 620 can be mechanically coupled with the valve body 606 (e.g., utilizing fasteners). The valve cover 620 can provide support for a back end of the spring 612, as shown in FIG. 6. The valve cover 620 can be removed to allow an access for a user to replace parts of the check valve 108. For example the valve cover 620 can be used to access the clapper 610 to replace the gasket. A gasket can be situated between the valve body 606 and the valve cover 620 to provide a fluidly sealed connection between the valve cover 620 and the valve body 606.

Figure 7:
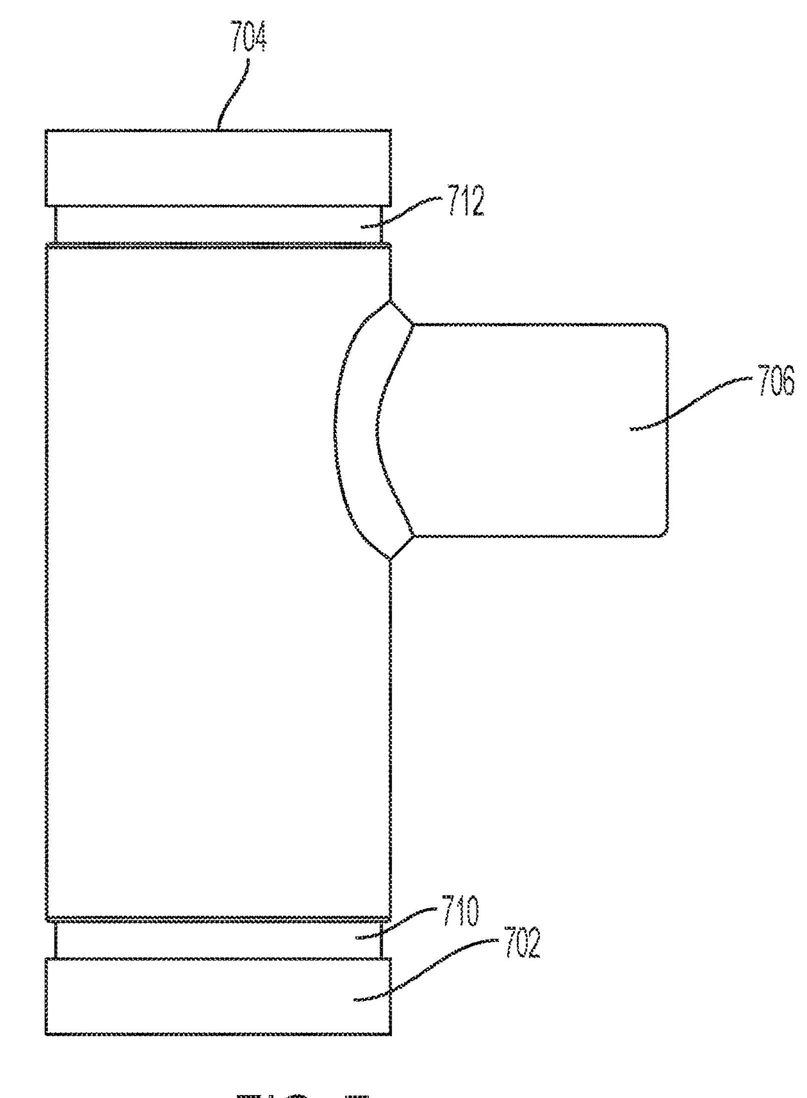
FIG. 7 is an illustration of a second spool pipe.

Referring now to FIG. 7, among others, a side view of the second spool pipe 110 is shown. The second spool pipe 110 can be of any suitable material (e.g., steel, PVC, CPVC). The second spool pipe 110 can include an inlet 702, an outlet 704, and an auxiliary port 706. A distance between the inlet 702 and the outlet 704 can be less than or equal to 7 inches. The distance between the inlet 702 and the outlet 704 can be greater than 7 inches. The inlet 702, as shown in FIG. 7, can include an inlet groove 710 defining a recession located on an outer surface of the second spool pipe 110 located inward (e.g., nearer a center of the second spool pipe 110) of the inlet 702. The inlet groove 710 can surround a circumference of the inlet 702. The inlet groove 710 can be an abrupt groove (e.g., squared edges) or can be a rounded or chamfered groove. The inlet groove 710 can provide a recession for the second spool pipe 110 to be connected with the check valve 108, among other components, utilizing a mechanical coupling 114. The inlet 702 can be configured for a welded connection. The inlet 702 can be configured for a threaded connection (e.g., internal threads, external threads). The outlet 704, as shown in FIG. 7, can include an outlet groove 712 defining a recession located on an outer surface of the second spool pipe 110 located inward (e.g., nearer a center of the second spool pipe 110) of the outlet 704. The outlet groove 712 can surround a circumference of the outlet 704. The outlet groove 712 can be an abrupt groove (e.g., squared edges) or can be a rounded or chamfered groove. The outlet groove 712 can provide a recession for the second spool pipe 110 to be connected with the fire suppression system, among many possible connections, utilizing a mechanical coupling 114. The outlet 704 can be configured for a welded connection. The outlet 704 can be configured for a threaded connection (e.g., internal threads, external threads).

The auxiliary port 706 can be a section of pipe that extends outward from the center of the second spool pipe 110 as shown in FIG. 7. The auxiliary port 706 can be fastened (e.g., threaded) or welded to the second spool pipe 110. The auxiliary port can have an outlet located at a second end of the auxiliary port 706 extended outward from the second spool pipe 110. The outlet can be threaded (e.g., internally threaded, externally threaded). The outlet can be configured to provide a welded connection. The outlet of the auxiliary port 706 can be connected with the test and drain valve 112. The connection of the test and drain valve 112 to the outlet of the auxiliary port 706 can be beneficial as the position of the test and drain valve 112 can be adjusted relative to the check valve 108 due to the rotational adjustment capabilities of the second spool pipe 110. The auxiliary port 706 can be of a diameter ranging from 1 inch to 2.5 inches.

Figure 8:
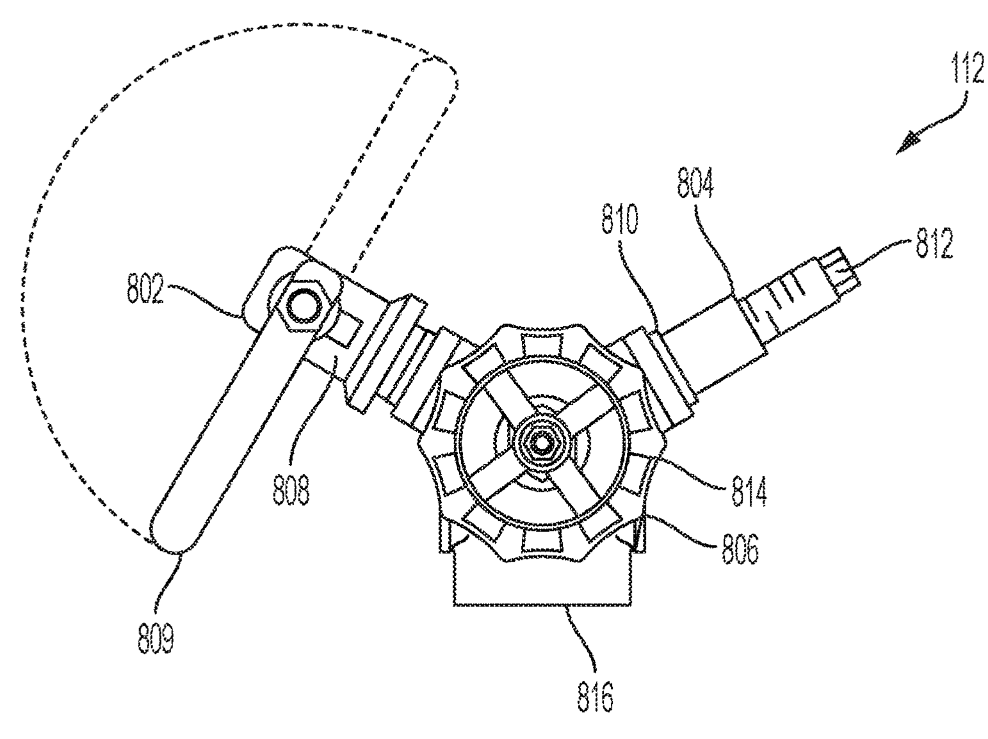
FIG. 8 is an illustration of a front view of a test and drain valve.
Figure 9:
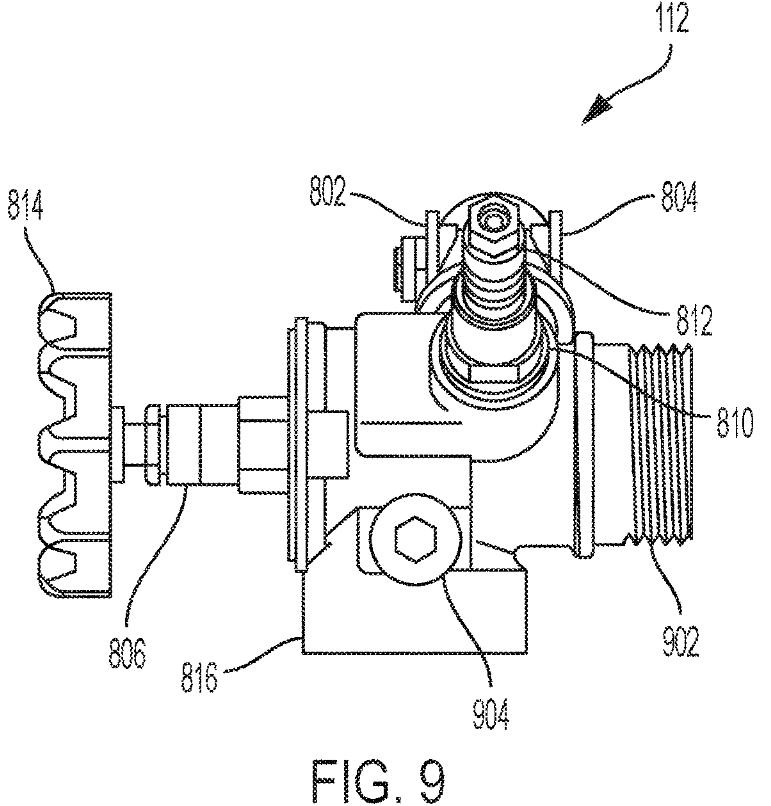
FIG. 9 is an illustration of a side view of a test and drain valve.

Referring now to FIGS. 8 and 9, among others, a front view and a side view of the test and drain valve 112, respectively, are shown. A particular test and drain valve 112 is shown in FIGS. 8 and 9, but the disclosure is not so limited. The test and drain valve 112 can include an inlet 902, a test valve 802, a pressure relief valve 804, a drain valve 806, and a sight glass 904.

The test valve 802 can be operable between an open position and a closed position. In the open position, the riser manifold assembly 100 can be tested to ensure the check valve 108 opens based on the pressure differential caused by releasing fluid through the test valve 802 to the environment, and the flow control switch 106 detects the flow of fluid. In the closed position, the test valve 802 can inhibit the flow through the test valve into the environment. The test valve 802 can be any suitable valve type (e.g., ball valve, gate valve, butterfly valve). The test valve 802 can include a test valve body 808 and a control arm 809. The control arm 809 can be used to manually open and close the test valve 802. The control arm 809 can have a rotation ability of 90°. The control arm 809 can have a rotation ability of 180°. The test valve body 808 can include an inlet that is connected with a body of the test and drain valve 112. The test valve body 808 can be threaded into the body of the test and drain valve 112. The test valve body 808 can be welded to the body of the test and drain valve 112. The test valve body 808 can be formed as a unitary piece with the body of the test and drain valve 112.

The pressure relief valve 804 can provide a relief for the riser manifold assembly 100 and the fire suppression system in the case that the pressure is above a predetermined level (e.g., 25 PSI, 100 PSI, 500 PSI). When the pressure at the test and drain valve 112 is above the predetermined level, the pressure relief valve 804 can release fluid into the environment. The pressure relief valve 804 can include a pressure relief body 810 and a pressure relief cap 812. The pressure relief body 810 can be threaded into the body of the test and drain valve 112. The pressure relief body 810 can be welded to the body of the test and drain valve 112. The pressure relief body 810 can be formed as a unitary piece with the body of the test and drain valve 112. The pressure relief cap 812 can be threaded into the pressure relief body 810. The pressure relief cap 812 can include markings on the side of the pressure relief cap 812, as shown in FIG. 8. The predetermined level of pressure before release into the environment can be set by threading the pressure relief cap 812 into the pressure relief body 810 until the predetermined level of pressure as marked on the side of the pressure relief cap 812 is in line with an upper surface of the pressure relief body 810.

The drain valve 806 can provide a user the ability to drain fluid from the fire suppression system. The drain valve 806 can have a diameter greater than or equal to 0.75 inches. The drain valve 806 can have a diameter less than 0.75 inches. The drain valve 806 can be any suitable valve type (e.g., gate valve, ball valve, butterfly valve). The drain valve 806 can include a valve knob 814 and a drain port 816. The valve knob 814 can be any suitable handle for a manual opening or closing of the drain valve 806 (e.g., knob, arm, hand wheel). The valve knob 814 can be used to manually open and close the drain valve 806. The drain port 816 can be a port that allows the drained fluid to be released into the environment. The drain port 816 can include internal threads such that a hose or pipe can be threaded into the drain port 816. The drain valve 806 can be formed as a unitary piece of the test and drain valve 112.

The test and drain valve 112 can include an inlet 902. The inlet 902 can be externally threaded, as shown in FIG. 9. The inlet 902 can be internally threaded. The inlet 902 can have threads compatible with the auxiliary port 706, such that the inlet 902 can be threaded with the auxiliary port 706. The inlet 902 can be configured such that the inlet 902 can be welded to the auxiliary port 706. The test and drain valve 112 can include a sight glass 904 on either side of the test and drain valve 112. The sight glass 904 can be used to confirm fluid flow through the test valve 802, among other possible uses.

Figure 10:
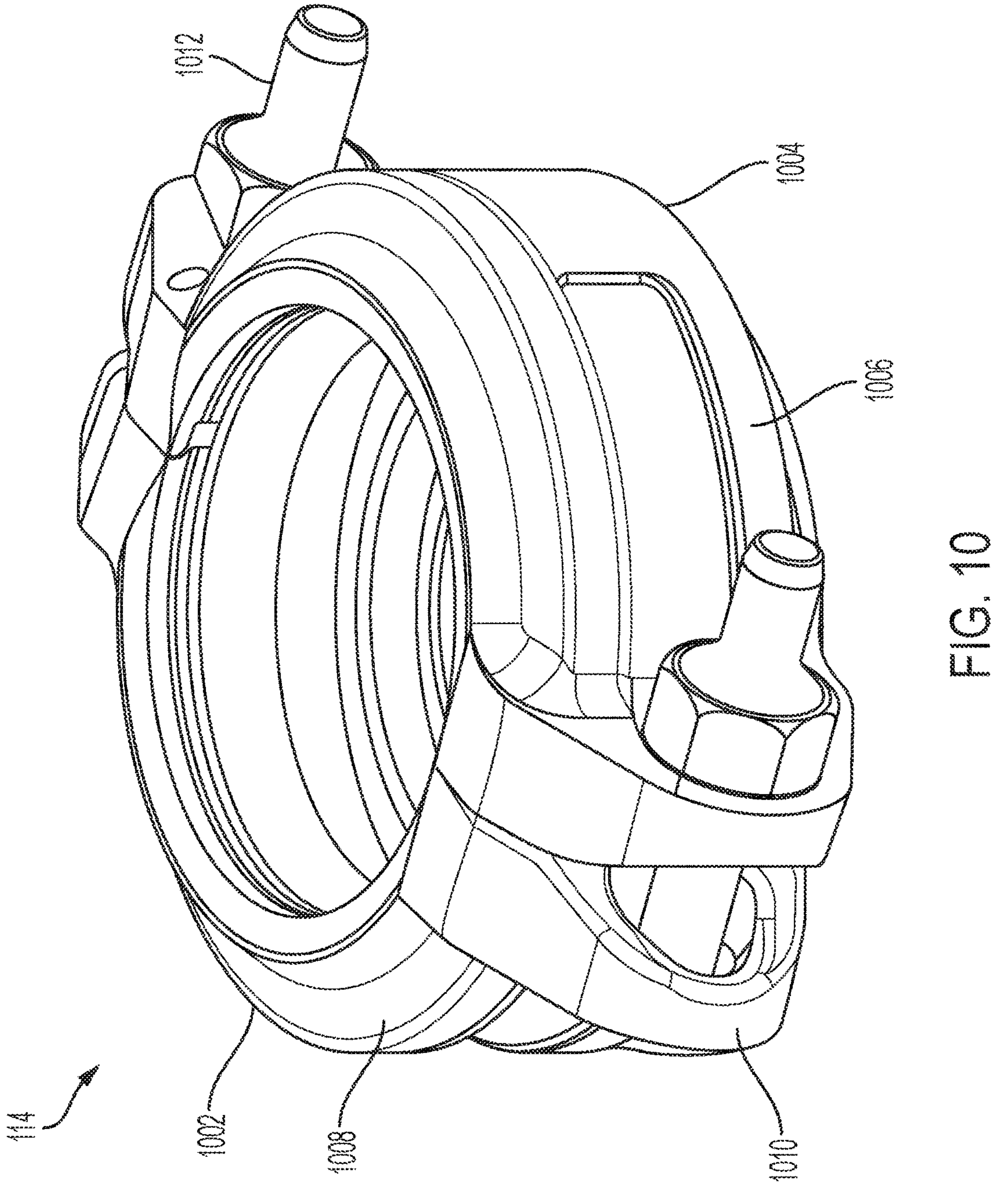
FIG. 10 is an illustration of a coupling.

Referring now to FIG. 10, among others, a perspective view of a coupling 114 is shown. The coupling 114 can be used to couple components of the riser manifold assembly 100. The coupling 114 can have a first half 1002 and a second half 1004. Each of the first half 1002 and the second half 1004 can have a lower groove 1006, an upper groove 1008, and a fastener bracket located on both a first end and a second end. An outlet of a first component, having an outlet groove, can abut an inlet of a second component, having an inlet groove. The first half 1002 and the second half 1004 can be applied to the abutment of the inlet and the outlet such that the lower groove 1006 can be surround a section of material between the inlet groove and the inlet and the upper groove 1008 can surround a section of material between the outlet and the outlet groove. Upon adjoining the first half 1002 and the second half 1004, fasteners 1012 (e.g., bolts) can be inserted through the fastener brackets 1010 and tightened. This is an example configuration of a coupling 114, and many other configurations and components are possible to mechanically couple a first component of the riser manifold assembly 100 to a second component of the riser manifold assembly 100.

Figures 11, 12:
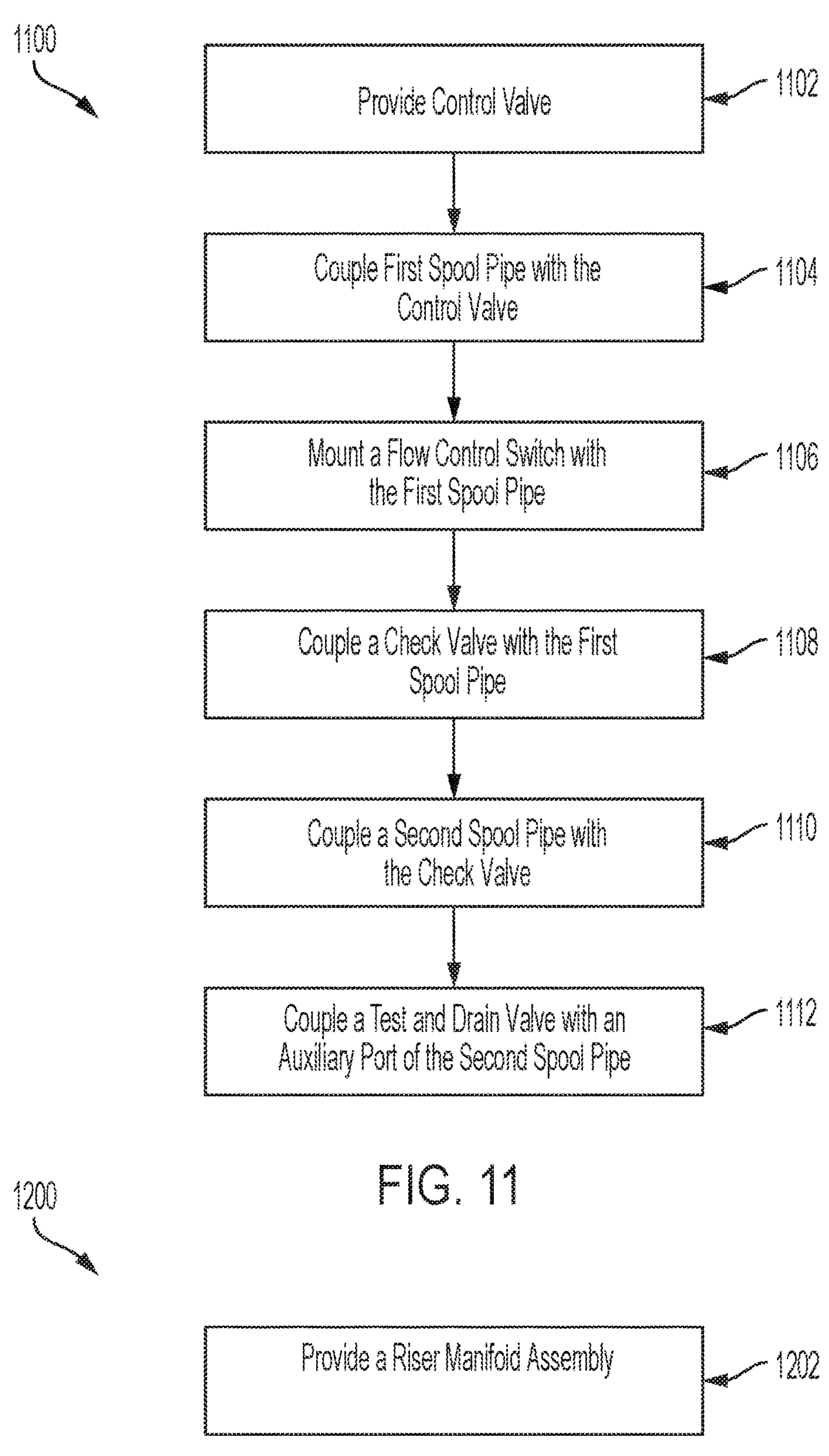
FIG. 11 is a flow diagram of a method of assembly of the riser manifold assembly.
FIG. 12 is a flow diagram of a method of providing the riser manifold assembly.

Referring now to FIG. 11, among others, a method for assembling the riser manifold assembly 100 is shown. The method can start at act 1102 by providing a control valve 102. At act 1104, the inlet 402 of the first spool pipe 104 can be coupled with the outlet 204 of the control valve 102. The first spool pipe 104 can be coupled with the control valve 102 utilizing a coupling 114 as described herein. This can be beneficial as it can permit the first spool pipe 104 to be rotated about the first longitudinal axis 120 relative to the control valve 102. The first spool pipe 104 can be coupled with the control valve utilizing a threaded connection or a welded connection.

At act 1106, the flow control switch 106 can be mounted with the first spool pipe 104. The vane 502 can be inserted into the flow port 408 of the first spool pipe 104. The pipe saddle 510 can create a seal against an outer surface of the first spool pipe 104. The vane 502 can expand such that the paddle 506 can create a seal against an internal surface of the first spool pipe 104. Fasteners 508 (e.g., u-bolts) can be utilized to fasten the flow control switch 106 to the first spool pipe 104.

At act 1108, the check valve 108 can be coupled with the first spool pipe 104. The inlet 602 of the check valve 108 can be mechanically coupled and fluidly sealed to the outlet 404 of the first spool pipe 104 utilizing a coupling 114 as described herein. This can be beneficial as it can permit the check valve 108 to be rotated about the first longitudinal axis 120 relative to the first spool pipe 104. The check valve 108 can be coupled with the first spool pipe 104 utilizing a threaded connection or a welded connection.

At act 1110, the second spool pipe 110 can be coupled with the check valve 108. The inlet 702 of the second spool pipe 110 can be mechanically coupled and fluidly sealed to the outlet 604 of the check valve 108 utilizing a coupling 114 as described herein. This can be beneficial as it can permit the second spool pipe 110 to be rotated about the first longitudinal axis 120 relative to the check valve 108. The second spool pipe 110 can be coupled with the check valve 108 utilizing a threaded connection or a welded connection.

At act 1112, the test and drain valve 112 can be coupled with the second spool pipe 110. The inlet 902 of the test and drain valve 112 can be coupled with the auxiliary port 706 of the second spool pipe 110 utilizing corresponding threads between an internal surface of the auxiliary port 706 and an external surface of the inlet 902. The test and drain valve 112 can be welded to the auxiliary port 706 of the second spool pipe 110. Intermediate pieces such as nipples or couplings can be used to connect the test and drain valve 112 to the second spool pipe 110. For example, the auxiliary port 706 can have external threads. In this instance a threaded coupling can be used to couple the external threads of the auxiliary port 706 to the external threads of the inlet 902.

Methodology 1100 is an example method and many other methods are possible for assembling the riser manifold assembly 100. For example the method can utilize alternate components or can be completed in a different order.

Referring now to FIG. 12, among others, a method for providing a riser manifold assembly 100 is shown. The method can start at act 1202 by providing a riser manifold assembly 100. The riser manifold assembly 100 can include a control valve 102 defined by an inlet 202 and an outlet 204. The control valve 102 can be operable between an open position, permitting fluid flow between the inlet 202 and the outlet 204, and a closed position, inhibiting fluid flow between the inlet 202 and the outlet 204. The riser manifold assembly 100 can further include a first spool pipe 104 defined by an inlet 402 and an outlet 404. The inlet 402 can be mechanically coupled and fluidly sealed with the outlet 204 of the control valve 102. The first spool pipe 104 can have a flow port 408 between the inlet 402 and the outlet 404.

The riser manifold assembly 100 can further include a flow control switch 106 having a vane 502 inserted in the flow port 408 of the first spool pipe 104. The flow control switch 106 can be mechanically mounted to the first spool pipe 104 creating a fluid seal between the flow control switch 106 and the flow port 408. The riser manifold assembly can further include a check valve 108 defined by an inlet 602 and an outlet 604. The inlet 602 can be mechanically coupled and fluidly sealed with the outlet 404 of the first spool pipe 104. The check valve 108 can have a valve seat 608 and a clapper 610. The clapper 610 can be movable between an open position, allowing fluid flow from the inlet 602 to the outlet 604, and a closed position, inhibiting fluid flow from the outlet 604 to the inlet 602, according to a pressure differential between the inlet 602 and the outlet 604. The check valve 108 can further have a first pressure port 616 (or downstream pressure port 616) located between the valve seat 608 and the outlet 604. The check valve 108 can further have an auxiliary port 618 located between the valve seat 608 and the outlet 604.

The riser manifold assembly 100 can further include a second spool pipe 110 having an inlet 702 and an outlet 704. The inlet 702 can be mechanically coupled and fluidly sealed with the outlet 604 of the check valve 108. The second spool pipe 110 can have an auxiliary port 706 located between the inlet 702 and the outlet 704. The riser manifold assembly 100 can further include a test and drain valve 112. The test and drain valve 112 can be mechanically coupled and fluidly sealed with the auxiliary port 706 of the second spool pipe 110.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A riser manifold assembly comprising:

a control valve defined by an inlet and an outlet, being operable between an open position, permitting fluid flow between the inlet and the outlet, and a closed position, inhibiting fluid flow between the inlet and the outlet;

a first spool pipe defined by an inlet and an outlet, the inlet of the first spool pipe being mechanically coupled and fluidly sealed with the outlet of the control valve, the first spool pipe having a flow port between the inlet and the outlet of the first spool pipe;

a flow control switch having a vane inserted in the flow port of the first spool pipe and the flow control switch mechanically mounted to the first spool pipe creating a fluid seal between the flow control switch and the flow port;

a check valve defined by an inlet and an outlet, the inlet of the check valve mechanically coupled and fluidly sealed with the outlet of the first spool pipe, the check valve having a valve seat and a clapper, the clapper being movable between an open position, allowing fluid flow from the inlet to the outlet, and a closed position, inhibiting fluid flow from the outlet to the inlet, according to a pressure differential between the inlet and the outlet, the check valve including:

a first pressure port located between the valve seat and the outlet of the check valve; and a first auxiliary port located between the valve seat and the outlet of the check valve;

a second spool pipe having an inlet and an outlet, the inlet of the second spool pipe being mechanically coupled and fluidly sealed with the outlet of the check valve, the second spool pipe having a second auxiliary port located between the inlet and the outlet of the second spool pipe;

a first pipe coupling that couples the check valve with the first spool pipe and a second pipe coupling that couples the second spool pipe with the check valve such that the control valve, the first spool pipe, the check valve, and the second spool pipe are rotatably adjustable about a longitudinal axis through the first spool pipe, the first pipe coupling, the check valve, the second pipe coupling, and the second spool pipe; and a test and drain valve mechanically coupled and fluidly sealed with the second auxiliary port of the second spool pipe.

2. The riser manifold assembly of claim 1 comprising:

the first auxiliary port having a diameter greater than or equal to 1 inch.

3. The riser manifold assembly of claim 1 comprising:

a distance between the inlet and the outlet of the second spool pipe being no longer than 7 inches.

4. The riser manifold assembly of claim 1 comprising:

a first end of the second auxiliary port is fastened or welded to the second spool pipe.

5. The riser manifold assembly of claim 4 comprising:

a second end of the second auxiliary port extending outward from the second spool pipe and having internal threads.

6. The riser manifold assembly of claim 1 comprising:

the second auxiliary port has a diameter between 1 inch and 2.5 inches.

7. The riser manifold assembly of claim 1 comprising:

the test and drain valve including:

an adjustable pressure relief valve movable between an open position, allowing fluid flow into an environment, and a closed position, inhibiting fluid flow into the environment, according to a pressure at the second auxiliary port of the second spool pipe;

an adjustable test valve operable between an open position, allowing fluid flow into the environment, and a closed position, inhibiting fluid flow into the environment; and a drain valve operable between an open position, allowing fluid flow into the environment, and a closed position, inhibiting fluid flow into the environment.

8. The riser manifold assembly of claim 1 comprising:

a second pressure port located between the inlet of the check valve and the valve seat.

9. The riser manifold assembly of claim 1 comprising:

the control valve being a butterfly valve.

10. A method of providing a riser manifold assembly, the method comprising:

providing a wet pipe riser manifold assembly, the riser manifold assembly comprising:

a control valve defined by an inlet and an outlet, being operable between an open position, permitting fluid flow between the inlet and the outlet, and a closed position, inhibiting fluid flow between the inlet and the outlet;

a first spool pipe defined by an inlet and an outlet, the inlet of the first spool pipe being mechanically coupled and fluidly sealed with the outlet of the control valve, the first spool pipe having a flow port between the inlet and the outlet of the first spool pipe;

a flow control switch having a vane inserted in the flow port of the first spool pipe and the flow control switch mechanically mounted to the first spool pipe creating a fluid seal between the flow control switch and the flow port;

a check valve defined by an inlet and an outlet, the inlet of the check valve mechanically coupled and fluidly sealed with the outlet of the first spool pipe, the check valve having a valve seat and a clapper, the clapper being movable between an open position, allowing fluid flow from the inlet to the outlet, and a closed position, inhibiting fluid flow from the outlet to the inlet, according to a pressure differential between the inlet and the outlet, the check valve including:

a first pressure port located between the valve seat and the outlet of the check valve; and a first auxiliary port located between the valve seat and the outlet of the check valve;

a second spool pipe having an inlet and an outlet, the inlet of the second spool pipe being mechanically coupled and fluidly sealed with the outlet of the check valve, the second spool pipe having a second auxiliary port located between the inlet and the outlet of the second spool pipe;

a first pipe coupling that couples the check valve with the first spool pipe and a second pipe coupling that couples the second spool pipe with the check valve such that the control valve, the first spool pipe, the check valve, and the second spool pipe are rotatably adjustable about a longitudinal axis through the first spool pipe, the first pipe coupling, the check valve, the second pipe coupling, and the second spool pipe; and a test and drain valve mechanically coupled and fluidly sealed with the second auxiliary port of the second spool pipe.

* * * * *